United States Patent
Liu et al.

(10) Patent No.: US 10,733,689 B2
(45) Date of Patent: Aug. 4, 2020

(54) DATA PROCESSING

(71) Applicant: ARM Limited, Cambridge (GB)

(72) Inventors: Jiangning Liu, Shanghai (CN); Zhennan Qin, Shanghai (CN); Hao Liu, Shanghai (CN)

(73) Assignee: ARM LIMITED, Cambridge (GB)

( * ) Notice: Subject to any disclaimer, the term of this patent is extended or adjusted under 35 U.S.C. 154(b) by 9 days.

(21) Appl. No.: 15/911,419

(22) Filed: Mar. 5, 2018

(65) Prior Publication Data

US 2018/0300844 A1 Oct. 18, 2018

(30) Foreign Application Priority Data

Apr. 13, 2017 (CN) .......................... 2017 1 0243277

(51) Int. Cl.
| | | |
|---|---|---|
| *G06F 3/06* | (2006.01) | |
| *G06F 9/38* | (2018.01) | |
| *G06T 1/20* | (2006.01) | |
| *G06F 9/50* | (2006.01) | |
| *G06F 30/331* | (2020.01) | |
| *G06F 111/02* | (2020.01) | |
| *G06F 115/08* | (2020.01) | |

(52) U.S. Cl.
CPC .............. *G06T 1/20* (2013.01); *G06F 3/0659* (2013.01); *G06F 9/3879* (2013.01); *G06F 9/5044* (2013.01); *G06F 30/331* (2020.01); *G06F 2111/02* (2020.01); *G06F 2115/08* (2020.01)

(58) Field of Classification Search
CPC .. G06F 17/5068; G06F 3/0659; G06F 9/3879; G06T 1/20
See application file for complete search history.

(56) References Cited

U.S. PATENT DOCUMENTS

| | | | |
|---|---|---|---|
| 8,410,994 B1 * | 4/2013 | Testa ......................... | G06F 3/14 345/1.3 |
| 8,745,173 B1 | 6/2014 | Tidd | |
| 8,766,990 B1 | 7/2014 | Tidd | |
| 8,922,569 B1 | 12/2014 | Tidd | |
| 9,183,663 B1 | 11/2015 | Tidd | |
| 2014/0179433 A1 | 6/2014 | Kent et al. | |
| 2017/0011487 A1 * | 1/2017 | Billyard ................ | G06T 15/005 |

OTHER PUBLICATIONS

Combined Search and Examination Report dated Jul. 26, 2018 in GB Application No. 1803060.1, 5 pages.

* cited by examiner

*Primary Examiner* — Sing-Wai Wu
(74) *Attorney, Agent, or Firm* — Nixon & Vanderhye PC (57) ABSTRACT

Data processing apparatus comprises a server device and a client device connected for data communication by a data communication path. The server device comprises a server graphics processing unit (GPU) to receive and process graphics processing commands to generate processed graphics data. The client device comprises a client data processing unit; and a client GPU interface to receive graphics processing commands from the client data processing unit, to transmit graphics processing commands to the server GPU, to receive processed graphics data from the server GPU and to provide processed graphics data to the client data processing unit.

10 Claims, 6 Drawing Sheets

DATA PROCESSING

This application claims priority to CN Patent Application No. 201710243277.0 filed 13 Apr. 2017, the entire contents of which is hereby incorporated by reference.

BACKGROUND

This disclosure relates to data processing.

ARM Fast Model™ system represents an example of a software modelling system for simulating multiple systems IP cores or blocks integrated in a system or subsystem. Here such an "IP" core or block may be, for example, a reusable unit of circuitry layout, typically for use in an integrated circuit, having a design which is the intellectual property (IP) of one party. But the term may be used more generally, for example, for blocks of integrated circuitry layout which can be assembled together to provide a composite function.

The Fast Model system allows a customer (for example, a manufacturer which intends to fabricate a physical circuit according to the design being modelled) to run a simulation involving a whole software stack as early as system IPs' specification is just ready. An example relates to the modelling of graphics processing units (GPUs) modelling and verification, which has previously been difficult because 3D (three dimensional) graphical rendering simulation for GPU verification can be very slow.

With the Fast Model or similar systems, hardware IP interfaces can be defined by code such as so-called "LISA+" code and easily visualized and combined to generate a complete subsystem. GPU architecture is evolving quickly, and it tends to use large numbers of unified scalar cores to solve parallel data stream processing problems. Compared with GPU, typically a CPU (central processing unit) has fewer cores, but a single CPU core can be more complicated than a single GPU core, for example having a deeper pipeline and/or bigger caches. For historical reasons, the GPU can tend to be treated as a peripheral device in a computer architecture based around a CPU. Therefore, in whole system simulation, typically a CPU is used to simulate all devices including 3D rendering using a GPU, but the significant architecture level difference between CPUs and GPUs makes fast GPU simulation difficult. Also, the increasing display resolution in mobile systems (as an example of the use of such a modelled GPU) is demanding even higher computation resources for a simulation environment.

SUMMARY

In an example arrangement there is provided data processing apparatus comprising a server device and a client device connected for data communication by a data communication path;

the server device comprising:

a server graphics processing unit (GPU) to receive and process graphics processing commands to generate processed graphics data; and the client device comprising:

a client data processing unit; and a client GPU interface to receive graphics processing commands from the client data processing unit, to transmit graphics processing commands to the server GPU, to receive processed graphics data from the server GPU and to provide processed graphics data to the client data processing unit.

In another example arrangement there is provided circuitry emulation apparatus comprising:

data processing apparatus as defined above;

in which the client data processing unit is configured to execute circuitry emulation instructions and to generate, in response to execution of the circuitry emulation instructions, graphics processing commands to be provided, via the client GPU interface, to the server device.

In another example arrangement there is provided a server device connectable for data communication to a client device by a data communication path, the server device comprising:

a server graphics processing unit (GPU) to receive and process graphics processing commands to generate processed graphics data;

a server GPU interface to receive graphics processing commands from the client device in a first command format and to provide graphics processing commands to the server GPU for execution in a second command format.

In another example arrangement there is provided a client device connectable for data communication to a server device by a data communication path, the client device comprising:

a client data processing unit; and a client graphics processing unit (GPU) interface to receive graphics processing commands from the client data processing unit, to transmit graphics processing commands to a server GPU of the server device, to receive processed graphics data from the server GPU and to provide processed graphics data to the client data processing unit.

In another example arrangement there is provided a method of operation of a data processing apparatus comprising a server device and a client device connected for data communication by a data communication path; the method comprising:

a client GPU interface of the client device receiving graphics processing commands from a client data processing unit of the client device;

the client GPU interface transmitting graphics processing commands to a server GPU of the server device;

the server GPU receiving and processing graphics processing commands to generate processed graphics data;

the server device transmitting processed graphics data to the client device;

the client GPU interface receiving processed graphics data from the server GPU and providing processed graphics data to the client data processing unit.

In another example arrangement there is provided a method of operation of a server device connectable for data communication to a client device by a data communication path, the method comprising:

a server GPU interface of the server device receiving graphics processing commands from the client device in a first command format and providing graphics processing commands to a server GPU of the server device for execution in a second command format; and the server GPU receiving and processing graphics processing commands to generate processed graphics data.

In another example arrangement there is provided a method of operation of a client device connectable for data communication to a server device by a data communication path, the method comprising:

a client graphics processing unit (GPU) interface of the client device receiving graphics processing commands from a client data processing unit of the client device;

the client GPU interface transmitting graphics processing commands to the server device;

the client GPU interface receiving processed graphics data from the server device; and the client GPU interface providing processed graphics data to the client data processing unit.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides data processing apparatus comprising a server device and a client device connected for data communication by a data communication path;

the server device comprising:

a server graphics processing unit (GPU) to receive and process graphics processing commands to generate processed graphics data; and the client device comprising:

a client data processing unit; and a client GPU interface to receive graphics processing commands from the client data processing unit, to transmit graphics processing commands to the server GPU, to receive processed graphics data from the server GPU and to provide processed graphics data to the client data processing unit.

The example embodiments can provide an arrangement which advantageously allows graphics processing operations to be conducted remotely from a client device, with the processed results being provided back to the client device, for example for display. This is applicable to other areas but can be particularly useful in emulation or simulation arrangements where the performance of a simulated GPU is being evaluated.

In examples, the server device comprises a server GPU interface, and in examples the server GPU interface is configured to provide graphics processing commands to the server GPU for execution.

Command translation or mapping can be implemented in cases where the client data processing unit is configured to generate graphics processing commands in a first command format; the server GPU is configured to execute graphics processing commands in a second command format; and the server GPU interface and the client GPU interface are configured to translate graphics processing commands in the first command format into graphics processing commands in the second command format. This means that the server GPU does not necessarily have to be responsive to the client GPU command set.

In examples, the client data processing unit is configured to receive processed graphics data in a first graphics data format; the server GPU is configured to generate processed graphics data in a second graphics data format; and the server GPU interface and the client GPU interface are configured to translate processed graphics data in the second graphics data format into processed graphics data in the first graphics data format. The client GPU interface can be configured to emulate, for interactions between the client GPU interface and the client data processing unit, a graphics processing unit to process graphics processing commands in the first format.

The client device may comprise a client GPU. In examples, the client GPU interface is configured to selectively provide graphics processing commands received from the client data processing unit to either the client GPU or the server device. But the system can still operate if a client GPU is not provided, by the server device providing graphics processing services to the client device.

In examples of different instruction or command sets, the server GPU may be configured to process graphics processing commands representing a first set of graphics processing operations, and the client GPU may be configured to process graphics processing commands representing a second set of graphics processing operations, the first set of graphics processing operations including graphics processing operations which are not in the second set of graphics processing operations.

In examples, the client GPU interface is configured to reserve one or more memory regions, at the client device, to store processed graphics data.

To reduce transfer bandwidth requirements, in examples the server GPU interface is configured to compress processed graphics data to be transmitted to the client device by the data communication path; and the client GPU interface is configured to decompress processed graphics data received from the server device.

Various buffers may be used at the client and server devices during graphics processing. To avoid excessive transfers, such that data transfers are conducted when data is ready for display, in some examples the client device comprises a display buffer; the server GPU is configured to buffer the processed graphics data; and the client device is configured to transfer processed graphics data from the server device to the client device in response to a buffer size of the processed graphics data at the server GPU being the same as a buffer size of the display buffer.

However, in case an intermediate buffer happens to have the same size as a client display buffer, in examples the client device is configured to transfer processed graphics data from the server device in response to a detection that descriptor data associated with a buffer at the server GPU indicates that the buffer at the server GPU maps to the display buffer.

Another example embodiment provides circuitry emulation apparatus comprising:

data processing apparatus as defined above;

in which the client data processing unit is configured to execute circuitry emulation instructions and to generate, in response to execution of the circuitry emulation instructions, graphics processing commands to be provided, via the client GPU interface, to the server device.

Another example embodiment provides a server device connectable for data communication to a client device by a data communication path, the server device comprising:

a server graphics processing unit (GPU) to receive and process graphics processing commands to generate processed graphics data;

a server GPU interface to receive graphics processing commands from the client device in a first command format and to provide graphics processing commands to the server GPU for execution in a second command format.

Another example embodiment provides a client device connectable for data communication to a server device by a data communication path, the client device comprising:

a client data processing unit; and a client graphics processing unit (GPU) interface to receive graphics processing commands from the client data processing unit, to transmit graphics processing commands to a server GPU of the server device, to receive processed graphics data from the server GPU and to provide processed graphics data to the client data processing unit.

Another example embodiment provides a method of operation of a data processing apparatus comprising a server device and a client device connected for data communication by a data communication path; the method comprising:

a client GPU interface of the client device receiving graphics processing commands from a client data processing unit of the client device;

the client GPU interface transmitting graphics processing commands to a server GPU of the server device;

the server GPU receiving and processing graphics processing commands to generate processed graphics data;

the server device transmitting processed graphics data to the client device;

the client GPU interface receiving processed graphics data from the server GPU and providing processed graphics data to the client data processing unit.

Another example embodiment provides a method of operation of a server device connectable for data communication to a client device by a data communication path, the method comprising:

a server GPU interface of the server device receiving graphics processing commands from the client device in a first command format and providing graphics processing commands to a server GPU of the server device for execution in a second command format; and the server GPU receiving and processing graphics processing commands to generate processed graphics data.

Another example embodiment provides a method of operation of a client device connectable for data communication to a server device by a data communication path, the method comprising:

a client graphics processing unit (GPU) interface of the client device receiving graphics processing commands from a client data processing unit of the client device;

the client GPU interface transmitting graphics processing commands to the server device;

the client GPU interface receiving processed graphics data from the server device; and the client GPU interface providing processed graphics data to the client data processing unit.

Figure 1:
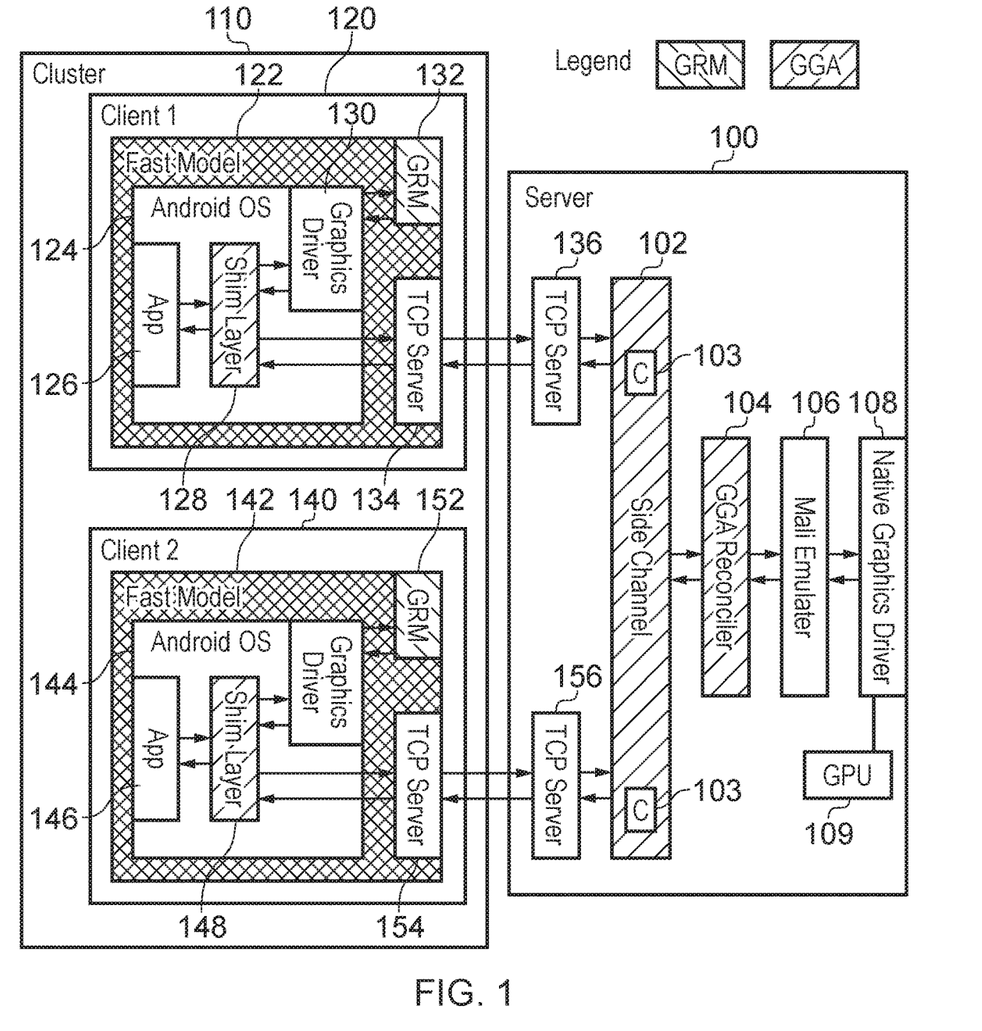
FIG. 1 schematically illustrates a data processing system.

FIG. 1 schematically illustrates a data processing system.

The apparatus of FIG. 1 comprises a server device 100 and a cluster 110 of client devices 120, 140. Each client device can interact separately with the server device 100 and can carry out corresponding operations which, from the point of view of the client's devices, are independent. So, the discussion below will concentrate on an example individual client device such as the client device 120, on the understanding that similar and corresponding operations can be carried out (as mentioned above, independently from the point of view of the client devices) by other client devices such as the client device 140. Further client devices not shown in FIG. 1 may form part of the cluster 110 and/or may separately access the server device 100.

The operations of a client device to run software representing the so-called Fast Model simulation environment will be described. In particular, operations relating to the Fast Model environment 122, 142 will be described in detail, and other unrelated operations of the client devices will not be described in detail. The example client devices shown here run a so-called Android operating system (OS) 124, 144. Under the Android OS, an application 126, 146 ("App") is an application program which makes use of GPU functionality, that functionality being provided by the simulated environment of the Fast Model. So, from the point of view of the application 126, 146 the aim is that the application can generate function calls for GPU operations and those function calls are handled as though a physical GPU corresponding to the modelled GPU is provided.

Function calls relating to GPU operations are provided from the app to a so-called shim layer 128, 148. These can be function calls using a so-called application program interface (API) and which would, if the system were using a physical GPU of the type being simulated, be recognised and acted upon by such a physical GPU.

The GPU function calls are routed by the shim layer 128 either to a graphics driver 130 which interacts with so-called GRM software 132 forming part of the Fast Model (and which will be described further below) or to a TCP (transmission control protocol) server 134, 154 which provides a communication path with the server device 100, interacting with a corresponding TCP server 136, 156 at the server device 100. Therefore, for these purposes, the shim layer forms an example of a client GPU interface configured to emulate, for interactions between the client GPU interface and the client data processing unit, a graphics processing unit to process graphics processing commands in a first format (a format expected by the client CPU). It is configured to selectively provide graphics processing commands received from the client data processing unit to either the client GPU or the server device.

Note however that the GRM software is not required. If it is provided, the graphics processing commands can be selectively handled by the Fast Model or by the server device. If the GRM software is not provided, the graphics processing commands can be handled by the server device. So, even if the GRM were not provided, the graphics results could still be obtained and utilised (for example, for display).

So, GPU operations required by the application 126, 146 can be handled either by the GRM 132, 152 or can be routed to the server device 100 via the TCP servers at the client and server devices.

There are therefore two ways in this example of executing GPU commands to provide rendering operations to the app 126. One is to use the GRM (Graphics Register Model) which is a graphics processing resource provided as part of the Fast Model and executed at each client device. The other is to use GGA (Generic Graphics Acceleration) which is provided at least in part by the server device 100. One or both of these can be used in a particular simulation situation. For example, and as discussed below, the graphic processing throughput of the server 100 may be greater than that which can be provided by the GRM of a particular client and so simulation may start by using the GGA mechanism and the resources of the server 100. As a cross-check, further simulation can be carried out using the GRM of the client device.

Respective portions of the processing relating to the GGA and GRM are illustrated schematically by hatching in FIG. 1.

Returning to the server 100, GPU commands received via the TCP server 136, 156 are provided to a so-called Fast Model Side Channel Plugin 102 which interacts with a GGA reconciler 104. The side channel 102 and/or the GGA reconciler 104 may provide cache memory resource 103 to store incoming commands and/or outgoing processed results. For the purposes of the current operation, the side channel 102 and the GGA reconciler 104 cooperate to receive GPU commands from the client devices and to arrange those commands in an order for execution at the simulation system of the server 100. The GGA reconciler 104 and the side channel 102 also coordinate the provision of the appropriate processed results (for example, via the cache memory resource 103) back to the respective clients which requested those results.

The GGA reconciler 104 also completes the following: (a) maintains so-called Open GLES (Open Graphics Library for Embedded Systems) states at the server and prepares parameters for calling API calls at the server device, (b) calls API operations at the server through a Mali emulator 106 or a native graphics driver 108, and (c) converts a frame buffer format at the server to a target format appropriate to the requesting client device and writes the data back to the side channel 102 to be returned to the requesting client device.

So, as mentioned above, in some examples the commands received from the client devices can be in the Open GLES format. However, some commands may need to access the Open GL state at the server, such as the so-called transform-feedbackbuffer or shaderstoragebuffer commands. For these, buffer data at the server has to be accessed and written back to buffer memory in the requesting client device. The Mali emulator 106 is an existing system which converts Open GLES to Open GL format interactions, so that the Mali emulator 106 can receive API commands from the GGA reconciler 104 and dispatch them in the Open GL format to the native graphics driver 108. If the native graphics driver at the server 100 directly supports Open GLES, the Mali emulator 106 is unnecessary and Open GLES API commands can be provided directly to the native graphics driver 108.

The native graphic driver 108 accesses GPU resource 109 at the server device.

The transfer or translation of commands or command formats can be performed at the client side, the server side, or both. For example, this could be performed by the Shim layer, the GGA reconciler and/or the Mali emulator. In example embodiments the client data processing unit is configured to generate graphics processing commands in a first command format; the server GPU is configured to execute graphics processing commands in a second command format; and the server GPU interface and the client GPU interface are configured to translate graphics processing commands in the first command format into graphics processing commands in the second command format.

Similarly, the preparation of suitable data to be returned to the client device can be carried out at the GGA reconciler, for example. In example embodiments, the client data processing unit is configured to receive processed graphics data in a first graphics data format; the server GPU is configured to generate processed graphics data in a second graphics data format; and the server GPU interface and the client GPU interface are configured to translate processed graphics data in the second graphics data format into processed graphics data in the first graphics data format.

Figure 2:
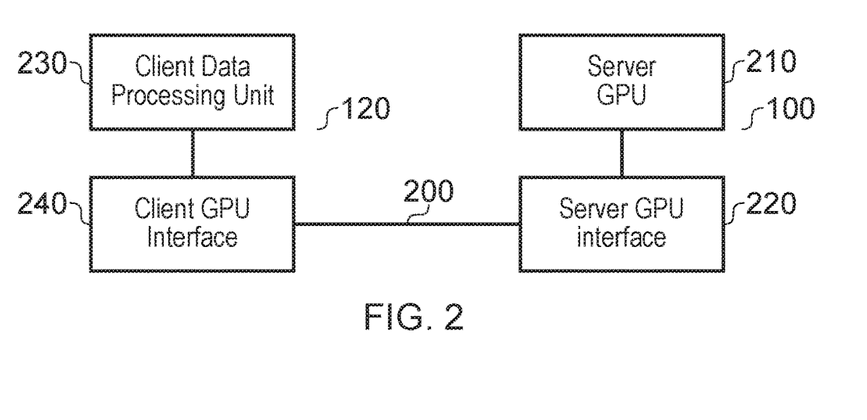
FIG. 2 schematically illustrates a client device connected to a server device.

These arrangements can be summarised in the schematic representation of FIG. 2, which illustrates a data processing apparatus comprising a server device 100 and a client device 120 connected for data communication by a data communication path 200 (which may include the TCP servers discussed above). The server device comprises a server graphics processing unit (GPU) 210 (for example, implemented as 108, 109 discussed above) to receive and process graphics processing commands to generate processed graphics data. A server GPU interface 220 is configured to provide graphics processing commands to the server GPU for execution. The client device 120 comprises a client data processing unit 230 such as a CPU executing the Fast Model arrangement 122 shown in FIG. 1; and a client GPU interface 240 (such as the Shim layer 128) to receive graphics processing commands from the client data processing unit, to transmit graphics processing commands to the server GPU, to receive processed graphics data from the server GPU and to provide processed graphics data to the client data processing unit.

To save bandwidth the server GPU interface (such as the side channel 102) can be configured to compress processed graphics data to be transmitted to the client device by the data communication path; and the client GPU interface can be configured to decompress processed graphics data received from the server device.

In some examples, the client data processing unit 230 is configured to generate graphics processing commands in a first command format; the server GPU 210 is configured to execute graphics processing commands in a second command format; and as discussed above the server GPU interface 220 and the client GPU interface 240 are configured to translate graphics processing commands in the first command format into graphics processing commands in the second command format.

These systems may be implemented as circuitry emulation apparatus comprising: data processing apparatus as defined above, in which the client data processing unit is configured to execute circuitry emulation instructions and to generate, in response to execution of the circuitry emulation instructions, graphics processing commands to be provided, via the client GPU interface, to the server device.

Example embodiments provide a server device 100 connectable for data communication to a client device by a data communication path, the server device comprising: a server graphics processing unit (GPU) to receive and process graphics processing commands to generate processed graphics data; a server GPU interface to receive graphics processing commands from the client device in a first command format and to provide graphics processing commands to the server GPU for execution in a second command format.

Example embodiments provide a client device 120 connectable for data communication to a server device by a data communication path, the client device comprising: a client data processing unit; and a client graphics processing unit (GPU) interface to receive graphics processing commands from the client data processing unit, to transmit graphics processing commands to a server GPU of the server device, to receive processed graphics data from the server GPU and to provide processed graphics data to the client data processing unit.

Figure 3:
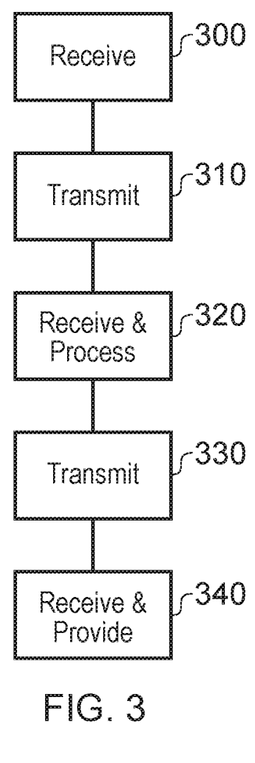
FIGS. 3 to 5 are schematic flowcharts illustrating respective methods.

FIG. 3 is a schematic flowchart illustrating a method of operation of a data processing apparatus comprising a server device and a client device connected for data communication by a data communication path; the method comprising:

a client GPU interface of the client device receiving (at a step 300) graphics processing commands from a client data processing unit of the client device;

the client GPU interface transmitting (at a step 310) graphics processing commands to a server GPU of the server device;

the server GPU receiving and processing (at a step 320) graphics processing commands to generate processed graphics data;

the server device transmitting (at a step 330) processed graphics data to the client device;

the client GPU interface (at a step 340) receiving processed graphics data from the server GPU and providing processed graphics data to the client data processing unit.

Figure 4:
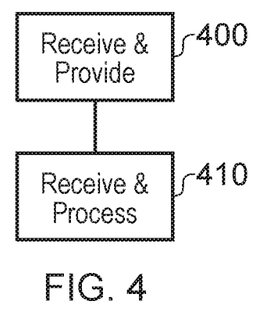

FIG. 4 is a schematic flowchart illustrating a method of operation of a server device connectable for data communication to a client device by a data communication path, the method comprising:

a server GPU interface of the server device (at a step 400) receiving graphics processing commands from the client device in a first command format and providing graphics processing commands to a server GPU of the server device for execution in a second command format; and the server GPU receiving and processing (at a step 410) graphics processing commands to generate processed graphics data.

Figure 5:
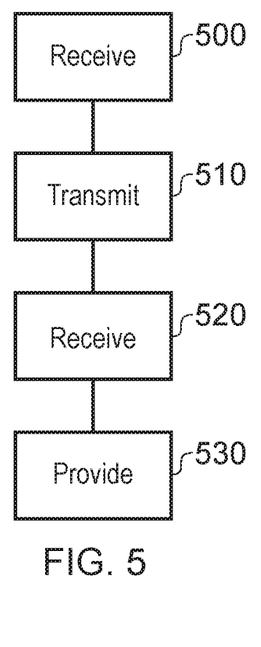

FIG. 5 is a schematic flowchart illustrating a method of operation of a client device connectable for data communication to a server device by a data communication path, the method comprising:

a client graphics processing unit (GPU) interface of the client device receiving (at a step 500) graphics processing commands from a client data processing unit of the client device;

the client GPU interface transmitting (at a step 510) graphics processing commands to the server device;

the client GPU interface receiving (at a step 520) processed graphics data from the server device; and the client GPU interface providing (at a step 530) processed graphics data to the client data processing unit.

In some examples, the server GPU is configured to process graphics processing commands representing a first set of graphics processing operations, and the client GPU is configured to process graphics processing commands representing a second set of graphics processing operations, the first set of graphics processing operations including graphics processing operations which are not in the second set of graphics processing operations.

Figure 6:
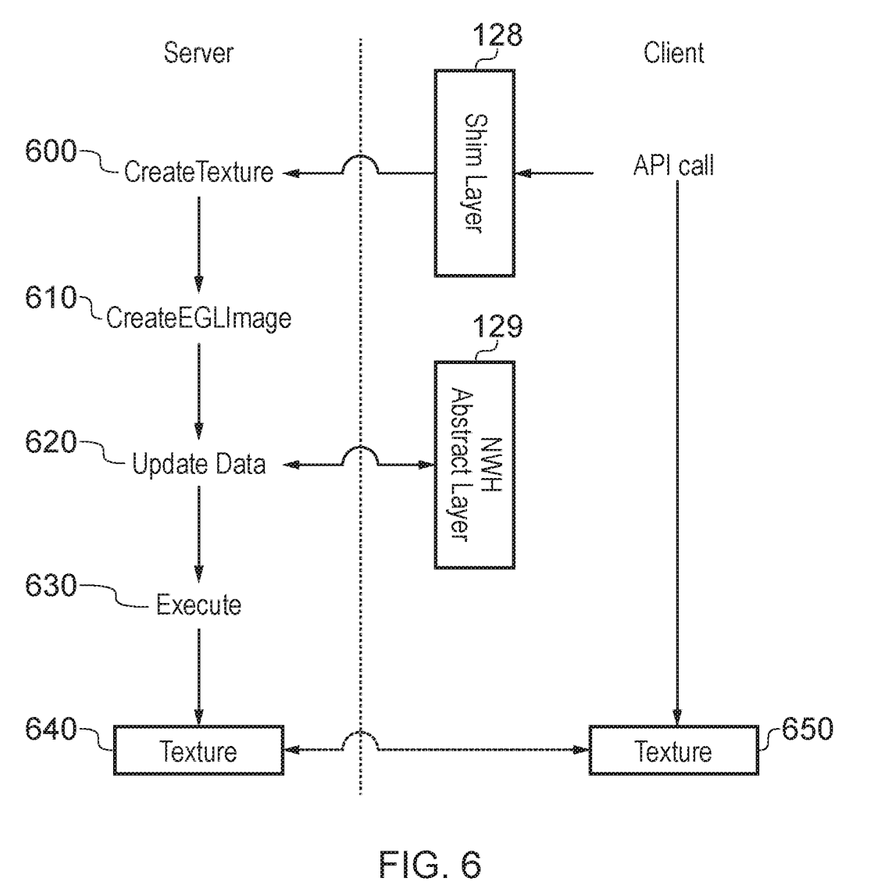
FIG. 6 schematically illustrates aspects of data communication between a client device and a server device.

FIG. 6 schematically illustrates the use of so-called libraries at the client device, providing the functionalities of the shim layer 128, 148 and a so-called NWH abstract layer 129, which can be provided alongside the shim layer in FIG. 1.

In FIG. 6, at the client device an API call such as the "glEGLImageTargetTexture2Does" operation is provided via the shim layer 128 to the server device. This operation attaches an image to texture data.

At the server device, steps are followed to create the appropriate texture 600, to create an EGL image 610 and then to update graphics processing data at a step 620. To do this, the server accesses the NWH abstract layer 129 at the client device, in order to access information such as a native windows buffer pointer at the client device required to execute (at a step 630) the glEGLImageTargetTexture2Does command. This results in the generation of the required texture 640 which is returned as discussed above to the client as a texture 650.

The server side GLES API execution can depend on a memory buffer copied from the client device. In some example implementations, the biggest memory bandwidth consumption between the server device and the client device is the native rendering buffer read from the sever device and written to the client device for each window that is visible.

Figure 7:
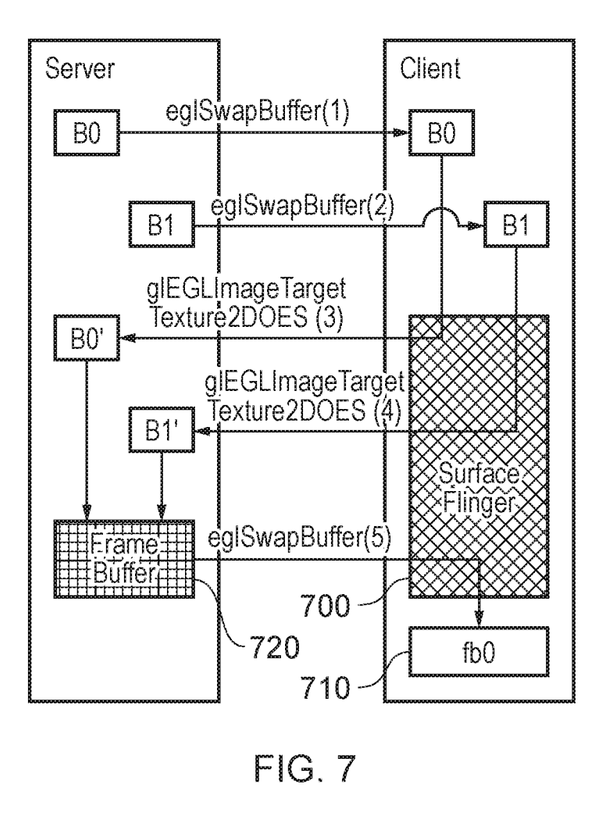
FIGS. 7 to 9 schematically illustrate the interaction of buffers in a client device and a server device.

FIG. 7 schematically illustrates an example arrangement by which a rendering buffer can be read and written with regard to a "Surface Flinger" 700 doing hardware composition. Here, the Surface Flinger is an Android system service, responsible for compositing items into a single buffer 710 that is to be displayed by a display controller.

As discussed above, the client device runs Fast Model, while the server is providing real 3D rendering work. When a command such as eglCreateSurface is called at the client device, a native buffer is created at the client. Correspondingly, the client device informs the server device to create a corresponding buffer for the GPU 109 in the server device. When rendering at the server side is finished, a command eglSwapBuffer will be invoked to copy memory back to client as indicated by (1) and (2). In the chart two buffers B0 and B1 are used as examples.

When Surface Flinger is triggered (for example by a display synchronising signal VSYNC signal from a display device at the client device), the software composition operation will dispatch GLES API glEGLImageTargetTexture2DOES to copy the buffers B0 and B1 in the client to buffers B0' and B1' in the server. At this moment B0' is B0, and B1' is B1 in terms of their data contents. After the real composition operation is completed in server, a frame buffer 720 fitting the required display size will be generated, and eglSwapBuffer is invoked to copy it back to the framebuffer device fb0 in Android OS of client.

In fact, the memory copies as described by (1)(2)(3)(4) can be saved, and the memory bandwidth consumption can be reduced accordingly by reducing some memory copies.

Figure 8:
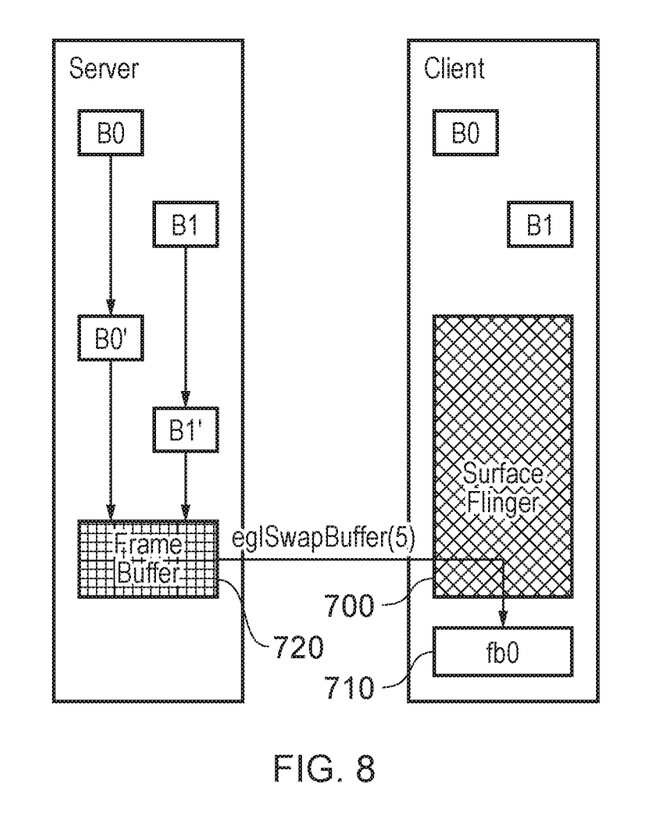

Referring to FIG. 8, in order to recognize that B0' is identically B0, and B1' is identically B1 at the server side, the display size at client is checked. If the size of the rendering buffer is just the size being used by the display it is assumed that the rendering buffer is for the hardware composition target, which is to say the device fb0. With this solution, about ¾ of frame buffer copy data traffic can potentially be reduced.

These arrangements therefore provide an example in which the client device comprises a display buffer (710); the server GPU is configured to buffer the processed graphics data (720); and the client device is configured to transfer processed graphics data from the server device to the client device in response to a buffer size of the processed graphics data (720) at the server GPU being the same as a buffer size of the display buffer (710).

However, for some examples cases, if the rendering buffer size is the same as the display size in the client device, but the buffer is not the target of surface hardware composition, the arrangement of FIG. 8 might operate incorrectly. In order to be able to detect that B0' is B0, and B1' is B1 in the server side, further detection may be used. In FIG. 8, an explicit connection between B0/B1 and B0'/B1' cannot be observed at the server side, but they are implicitly connected by the native buffer B0/B1 at the client side. Therefore, a solution can be to inform the server the connection, because otherwise it is necessary to infer this connection using the characteristics of the frame buffer.

Figure 9:
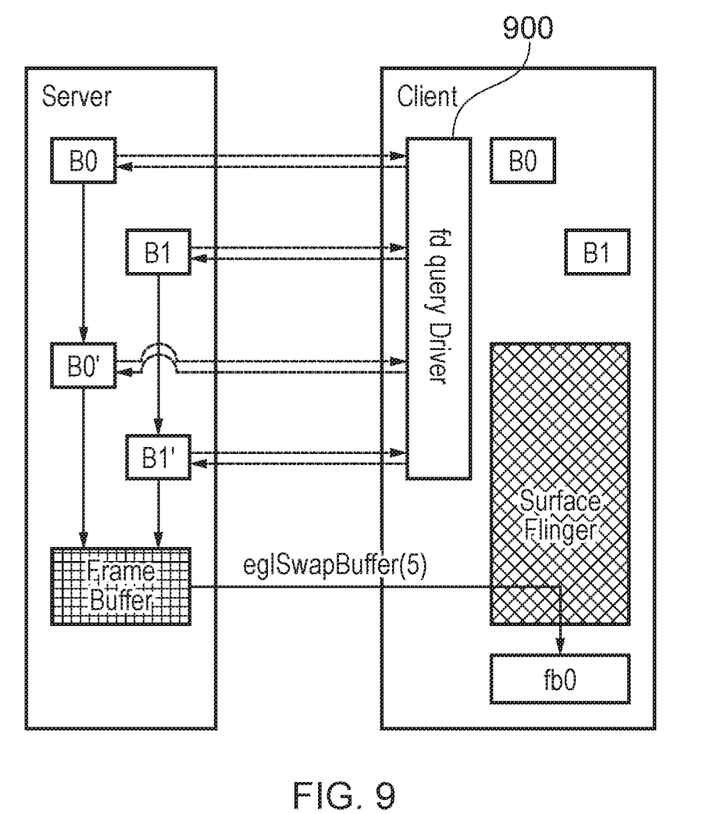

In examples embodiments, an fd query driver 900 is provided (for example, by integration into or addition to the Android OS) to check whether B0/B1 and B0'/B1' can be mapped with each other or not. This driver finds the hidden data structure in driver through the fd descriptor provided in user space, and then this information can be used to detect the relationships of the buffers exposed in user space.

In FIG. 9, the dotted lines represent operations to query the unique kernel buffer IDs through the fd query driver installed in the client device, so the unique IDs can then be used, for example by the fd query driver, to check the relationships of the buffers allocated at the client side, and then to decide whether there is a need to copy the native buffer from client to server. If it is found that there is already a buffer cache at the server side, this copy is not performed, and accordingly there is no need to copy the buffer back from server to client either. All of the rendering work in server will be based on the buffer cache, and only the frame buffer specially mapped to device fb0 in client side needs to be written back. Therefore, a lot of data transfer bandwidth can be saved.

This provides an example in which the client device is configured to transfer processed graphics data from the server device in response to a detection that descriptor data associated with a buffer at the server GPU indicates that the buffer at the server GPU maps to the display buffer.

Figure 10:
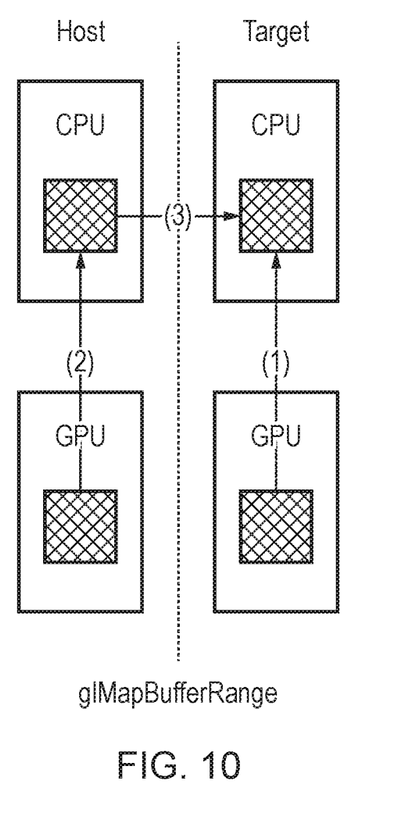
FIGS. 10 and 11 schematically illustrate techniques for memory coherence between a client device and a server device.
Figure 11:
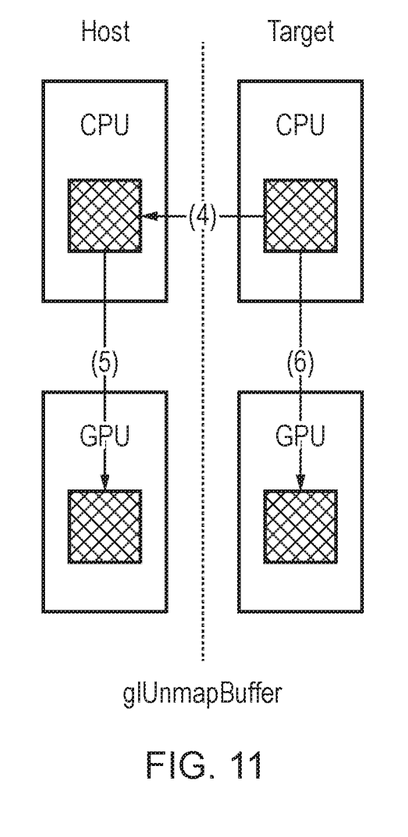

FIGS. 10 and 11 schematically illustrate techniques for memory coherence between a client device and a server device.

In an arrangement in which all processing operations were carried out at the client device, memory access between CPU and GPU can be guaranteed by operating system and driver support in a common kernel space.

However, this would not necessarily be the case when a client API call is dispatched to a server device operating in (potentially) a different address space.

This is particularly relevant for two example API operations glMapBufferRange and glUnmapBuffer, which are to map and unmap all or part of the data store of a specified buffer object from GPU to CPU.

FIGS. 10 and 11 schematically an example technique to handle these two APIs (or APIs leading to a similar issue) correctly.

Referring to FIG. 10, for glMapBufferRange, the operation is called in the client device first, and is then called at the server device followed by copying the mapped buffer data from host to target, i.e. (1)-(2)-(3).

For glUnmapBuffer, the steps are carried out in a reverse order, that is, copy the buffer back from target to host followed by calling it at the server device to unmap the buffer object for host GPU, and finally calling the operation at the client side as well, i.e. (4)-(5)-(6). Steps (3) and (6) make sure the correct semantic execution in target application and they are mandatory for maintaining OpenGL ES buffer object state in target driver.

This way, the memory coherence between target and host can be provided.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:

1. A data processing apparatus comprising a server device and a client device connected for data communication by a data communication path;

the server device comprising:
a server graphics processing unit (GPU) to receive and process graphics processing commands to generate processed graphics data and a server GPU interface; and the client device comprising:
a client data processing unit;
a client GPU; and
a client GPU interface to receive graphics processing commands from the client data processing unit, to transmit graphics processing commands to the server GPU, to receive processed graphics data from the server GPU and to provide processed graphics data to the client data processing unit, in which:
the client data processing unit is configured to generate graphics processing commands in a first command format;
the server GPU is configured to execute graphics processing commands in a second command format;
the server GPU interface and the client GPU interface are configured to translate graphics processing commands in the first command format into graphics processing commands in the second command format;
the client GPU interface is configured to emulate, for interactions between the client GPU interface and the client data processing unit, a graphics processing unit to process graphics processing commands in the first command format;
the client GPU interface is configured to selectively provide graphics processing commands received from the client data processing unit to either h the client GPU or the server device;
the server GPU is configured to process graphics processing commands representing a first set of graphics processing operations and the client GPU is configure to process graphics processing commands representing a second set of graphics processing operations, the first set of graphics processing operations including graphics processing operations which are not in the second set of graphics processing operations;
the server GPU interface is configured to compress processed graphics data to be transmitted to the client device by the data communication path; and
the client GPU interface is configured to decompress processed graphics data received from the server device.

2. The apparatus of claim 1, in which the server GPU interface is configured to provide graphics processing commands to the server GPU for execution.

3. The apparatus of claim 1, in which:
the client data processing unit is configured to receive processed graphics data in a first graphics data format;

the server GPU is configured to generate processed graphics data in a second graphics data format; and the server GPU interface and the client GPU interface are configured to translate processed graphics data in the second graphics data format into processed graphics data in the first graphics data format.

4. The apparatus of claim 3, in which:

the client device comprises a display buffer, the server GPU is configured to buffer the processed graphics data; and the client device is configured to transfer processed graphics data from the server device to the client device in response to a buffer size of the processed graphics data at the server GPU being the same as a buffer size of the display buffer.

5. The apparatus of claim 4, in which the client device is configured to transfer processed graphics data from the server device in response to a detection that descriptor data associated with a buffer at the server GPU indicates that the buffer at the server GPU maps to the display buffer.

6. The apparatus of claim 1, in which the client GPU interface is configured to reserve one or more memory regions, at the client device, to store processed graphics data.

7. A circuitry emulation apparatus comprising:

the data processing apparatus of claim 1;

in which the client data processing unit is configured to execute circuitry emulation instructions and to generate, in response to execution of the circuitry emulation instructions, graphics processing commands to be provided, via the client GPU interface, to the server device.

8. A client device connectable for data communication to a server device by a data communication path, the client device comprising:

a client data processing unit;

a client graphics processing unit (GPU); and a client GPU interface to receive graphics processing commands from the client data processing unit, to transmit graphics processing commands to a server GPU of the server device configured to process graphics commands to generate processed graphics data, to receive processed graphics data from the server GPU and to provide processed graphics data to the client data processing unit, the client GPU interface being configured to selectively provide graphics processing commands received from the client data processing unit to either the client GPU or the server device, the server GPU being configured to process graphics processing commands representing a first set of graphics processing operations, and the client GPU being configured to process graphics processing commands representing a second set of graphics processing operations, the first set of graphics processing operations including graphics processing operations which are not in the second set of graphics processing operations, the server GPU interface being configured to compress processed graphics data to be transmitted to the client device by the data communication path, and in which the client GPU interface is configured to decompress processed graphics data received from the server device.

9. A method of operation of a data processing apparatus comprising a server device and a client device having a client graphics processing unit (GPU) and being connected for data communication by a data communication path; the method comprising:

a client GPU interface of the client device receiving graphics processing commands from a client data processing unit of the client device;

the client GPU interface selectively providing graphics processing commands received from the client data processing unit to either of the client GPU or the server device;

a server GPU of the server device receiving and processing graphics processing commands to generate processed graphics data;

a server GPU interface of the server device compressing processed graphics data to be transmitted to the client device by the data communication path;

the server device transmitting processed graphics data to the client device;

the client GPU interface receiving and decompressing processed graphics data from the server GPU and providing processed graphics data to the client data processing unit; and the server GPU processing graphics processing commands representing a first set of graphics processing operations and the client GPU processing graphics processing commands representing a second set of graphics processing operations, the first set of graphics processing operations including graphics processing operations which are not in the second set of graphics processing operations.

10. A method of operation of a client device having a graphics processing unit (GPU) and being connectable for data communication to a server device by a data communication path, the method comprising:

a client GPU interface of the client device receiving graphics processing commands from a client data processing unit of the client device;

the client GPU interface selectively providing graphics processing commands received from the client data processing unit to either the client GPU or the server device, the client GPU processing graphics processing commands representing a second set of graphics processing operations, the second set of graphics processing operations including graphics processing operations which are not in a first set of graphics processing operations for processing by the server GPU;

the client GPU interface receiving compressed processed graphics data from the server device;

the client GPU interface decompressing compressed processed graphics data received from the server device; and the client GPU interface providing processed graphics data to the client data processing unit.

* * * * *